(12) United States Patent
Wells (10) Patent No.: US 11,035,829 B2
(45) Date of Patent: Jun. 15, 2021

(54) DUAL ULTRASONIC PROBE WITH VARIABLE ROOF ANGLE

(71) Applicant: OLYMPUS AMERICA INC., Center Valley, PA (US)

(72) Inventor: Jeffrey Wells, Howard, PA (US)

(73) Assignee: Olympus America Inc., Center Valley, PA (US)

( * ) Notice: Subject to any disclaimer, the term of this patent is extended or adjusted under 35 U.S.C. 154(b) by 206 days.

(21) Appl. No.: 15/795,869

(22) Filed: Oct. 27, 2017

(65) Prior Publication Data

US 2019/0128851 A1 May 2, 2019

(51) Int. Cl.
*G01N 29/24* (2006.01)
*G01N 29/04* (2006.01)
*G01N 29/22* (2006.01)

(52) U.S. Cl.
CPC .......... *G01N 29/24* (2013.01); *G01N 29/043* (2013.01); *G01N 29/221* (2013.01); *G01N 29/2487* (2013.01); *G01N 2291/044* (2013.01); *G01N 2291/056* (2013.01); *G01N 2291/102* (2013.01); *G01N 2291/105* (2013.01)

(58) Field of Classification Search
CPC ............ G01N 29/24; G01N 2291/105; G01N 29/265; G01N 2291/102; G01N 29/225; G01N 2291/044; G01N 2291/056; G01N 29/043; G01N 29/221; G01N 29/2487; G10K 11/355
USPC ......................................... 73/644, 633, 866.5
See application file for complete search history.

(56) References Cited

U.S. PATENT DOCUMENTS

| | | | | |
|---|---|---|---|---|
| 3,119,102 A | * | 1/1964 | Braen | G11B 5/265 360/230 |
| 3,938,372 A | * | 2/1976 | Sproule | G01N 29/221 73/633 |
| 4,165,649 A | * | 8/1979 | Greer, Jr. | G01N 29/28 73/644 |
| 4,454,767 A | * | 6/1984 | Shinkai | G01F 1/662 73/861.18 |
| 5,181,421 A | | 1/1993 | Kline | |
| 5,421,200 A | * | 6/1995 | Casarcia | G01N 29/223 73/628 |

(Continued)

FOREIGN PATENT DOCUMENTS

| | | |
|---|---|---|
| CN | 2874492 Y | 2/2007 |
| CN | 201653984 U | 11/2010 |

(Continued)

OTHER PUBLICATIONS

"European Application Serial No. 18199153.0, Extended European Search Report dated Jan. 30, 2019", 7 pgs.

(Continued)

*Primary Examiner* — Nimeshkumar D Patel
*Assistant Examiner* — Nashmiya S Fayyaz
(74) *Attorney, Agent, or Firm* — Schwegman Lundberg & Woessner, P.A.

(57) ABSTRACT

A dual probe assembly comprises dual transducers which are free to rotate over a desired range of roof angles required for different inspection applications. The roof angle for a particular application is defined by attaching the dual probe assembly to a wedge assembly having an upper contact surface which defines the roof angle of the transducers.

20 Claims, 5 Drawing Sheets

Section B-B (56) References Cited

U.S. PATENT DOCUMENTS

| | | | |
|---|---|---|---|
| 6,247,367 B1 | 6/2001 | Bar-Cohen et al. | |
| 6,578,424 B1 * | 6/2003 | Ziola | G01N 29/223 73/632 |
| 9,188,468 B2 * | 11/2015 | Rath | G01F 15/14 |
| 2006/0042391 A1 | 3/2006 | Georgeson et al. | |
| 2008/0148856 A1 | 6/2008 | Georgeson et al. | |
| 2009/0038398 A1 * | 2/2009 | Lavoie | G01N 29/225 73/637 |

FOREIGN PATENT DOCUMENTS

| | | | |
|---|---|---|---|
| CN | 202256267 U | 5/2012 | |
| CN | 103201622 A | 7/2013 | |
| CN | 104114104 A | 10/2014 | |
| CN | 106404897 A | 2/2017 | |
| CN | 109725062 A | 5/2019 | |
| KR | 101480787 B1 | 1/2015 | |
| WO | WO-9964093 A1 * | 12/1999 | A61M 5/365 |
| WO | WO2014148659 A1 | 9/2014 | |

OTHER PUBLICATIONS

"Chinese Application No. 201811216274.9, Office Action dated Feb. 7, 2021", with English Translation, 21 pages.

\* cited by examiner

FIG. 4A
Section A-A

FIG. 4B
Section A-A

FIG. 5B
Section B-B

FIG. 5A
Section B-B

DUAL ULTRASONIC PROBE WITH VARIABLE ROOF ANGLE

FIELD OF THE INVENTION

The invention relates to ultrasonic non-destructive testing and inspection (NDT/NDI), and more particularly to an integrated dual probe with variable roof angle for pitch-catch inspection.

BACKGROUND OF THE INVENTION

Figure 1:
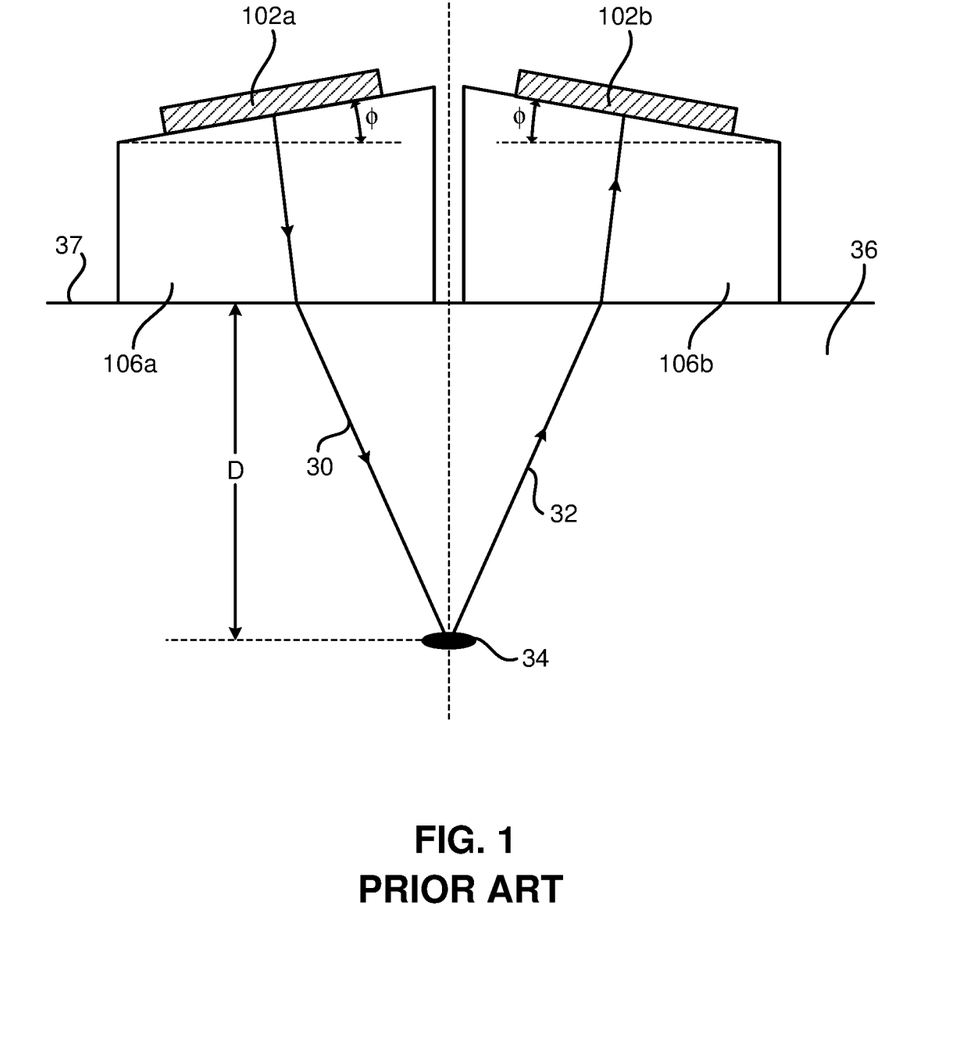
FIG. 1 is a schematic illustration of the pitch-catch mode of defect detection. illustrating the existing practice.

The principle of pitch-catch inspection is illustrated in FIG. 1 (prior art). Two probes 102a and 102b are each inclined at a roof angle φ and are coupled to a test object 36 with wedges 106a and 106b respectively. Probes 102a and 102b are configured so that probe 102a is an emitting probe, emitting an ultrasonic beam 30, and probe 102b is a receiving probe, receiving an ultrasonic echo beam 32 from a defect 34 at depth D below a test surface 37 of test object 36. Probes 102a and 102b may be phased array probes in which case there may be multiple emitted and received ultrasonic beams, and the beams may be focused to have maximum sensitivity at or near the location of defect 34 at depth D.

It should be noted that although FIG. 1 illustrates a planar test surface 37, the same principles apply for a test object 36 which is a pipe or other round or irregular surface. For inspecting a test object 36 having a round or irregular test surface 37, the bottom surfaces of wedges 106a and 106b would be customized to conform to test surface 37.

As illustrated in FIG. 1, probes 102a and 102b and wedges 106a and 106b are separate assemblies. This arrangement has the disadvantage of large footprint: there are two separate probe housings and multiple cables. Typically, the size of the separate assemblies cannot be reduced sufficiently to allow pitch-catch inspection of small diameter tubes.

On the other hand, integrated dual probe assemblies comprising both probes 102a and 102b in a single housing with fixed roof angle are known in the art. Such integrated probe assemblies are advantageous in that dual probes may be compactly packaged in a single housing with a single cable. However, a major disadvantage of integrated probe assemblies in existing practice is that they are costly and, since the roof angle is fixed, a different integrated probe assembly must be manufactured for each desired roof angle.

There therefore exists a need in the art for an integrated probe assembly in which the roof angle is variable over the entire range of desired roof angles.

SUMMARY OF THE INVENTION

Accordingly, it is a general objective of the present disclosure to provide an integrated probe assembly having two probes configured so that the roof angle is fully adjustable over the entire range of useful roof angles.

The objective is achieved by housing two piezoelectric composite transducers within frames which are supported by dowel pins, such that the frames and transducers may rotate freely over the desired range of roof angles. The required roof angle for a specific inspection application is defined by mounting the probe assembly to an upper contact surface of a wedge assembly, wherein the upper contact surface defines the required roof angle.

DETAILED DESCRIPTION OF PREFERRED EMBODIMENT

Figure 2:
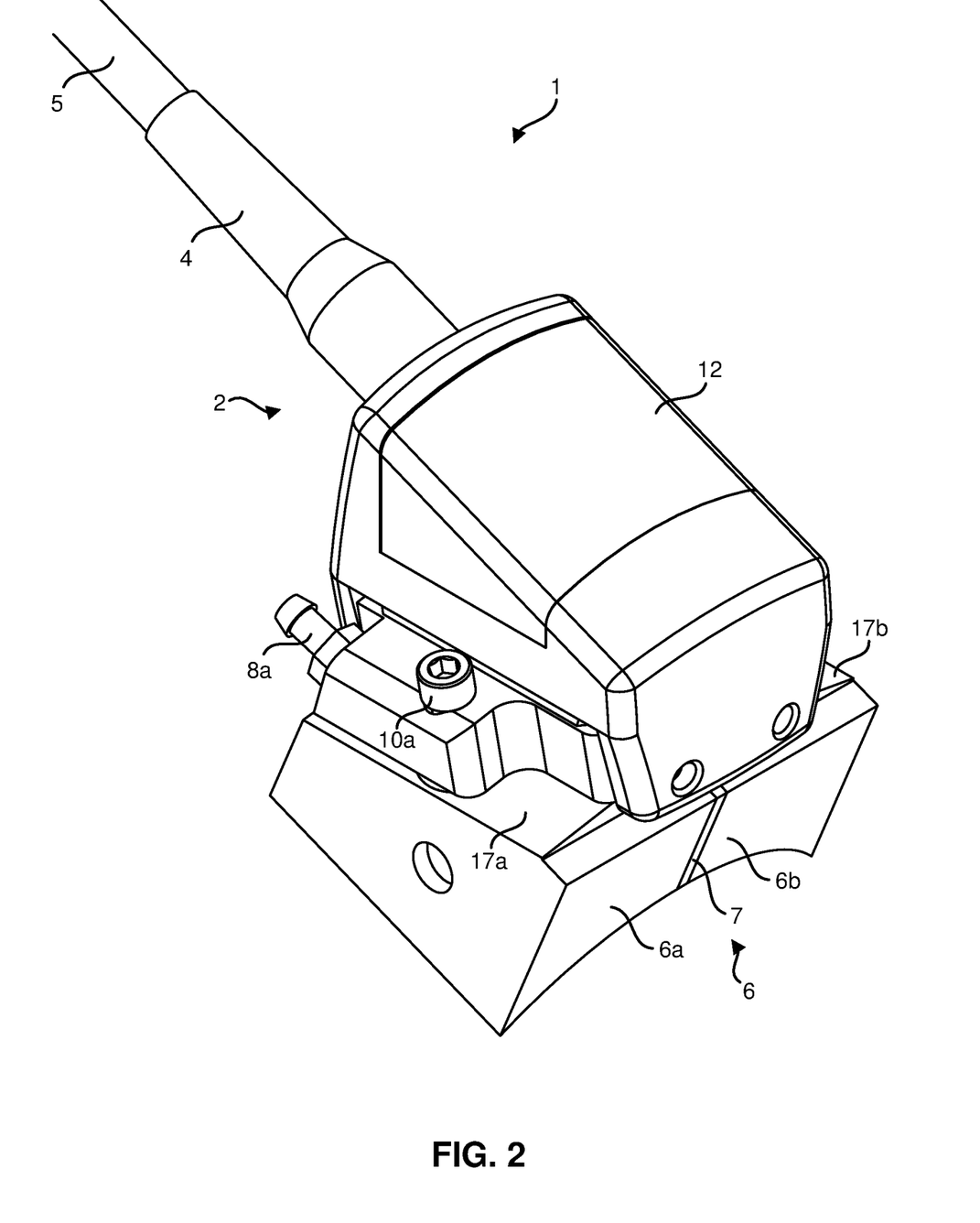
FIG. 2 is an isometric view of a dual probe assembly according to the present disclosure.
Figure 5A:
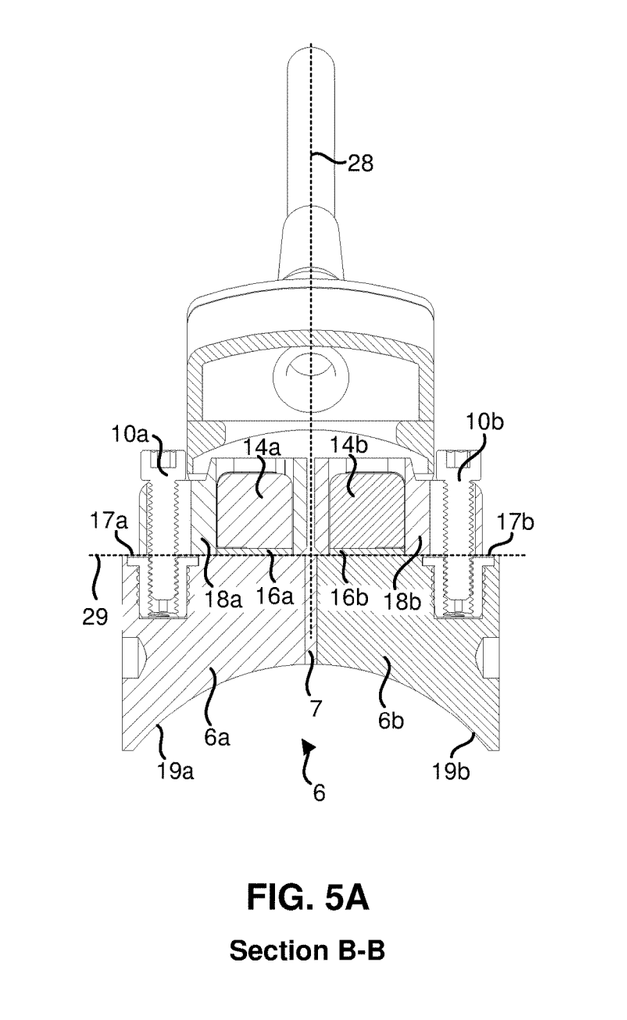
FIG. 5A is a section view of a dual probe and wedge assembly according to the present disclosure, with probes configured at 0° roof angle.
Figure 5B:
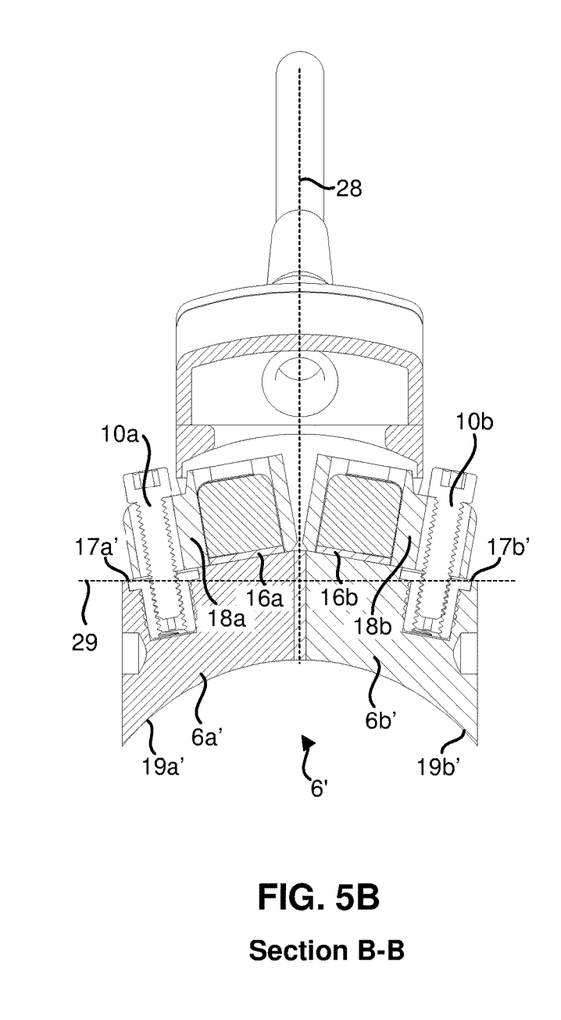
FIG. 5B is a section view of a dual probe and wedge assembly according to the present disclosure, with probes configured at 10° roof angle.

FIG. 2 is an isometric view of a dual probe and wedge assembly 1 comprising a dual probe assembly 2 attached to a wedge assembly 6 with screws 10a and 10b (not shown in FIG. 2, see FIGS. 5A and 5B). Wedge assembly 6 comprises a left wedge 6a and a right wedge 6b, separated by an acoustic barrier 7 which prevents acoustic cross-talk between left wedge 6a and right wedge 6b. Dual probe assembly 2 comprises a left piezoelectric composite transducer 16a and a right piezoelectric composite transducer 16b (see FIGS. 5A and 5B) contained within a probe housing 12. Cables for making electrical contact with elements of transducers 16a and 16b are preferably contained within a cable jacket 5 and a cable strain relief 4. Couplant inlet/outlet manifolds 8a and 8b (not shown) provide a liquid couplant, preferably water, to facilitate acoustic coupling between dual probe and wedge assembly 1 and test surface 37.

Figure 3:
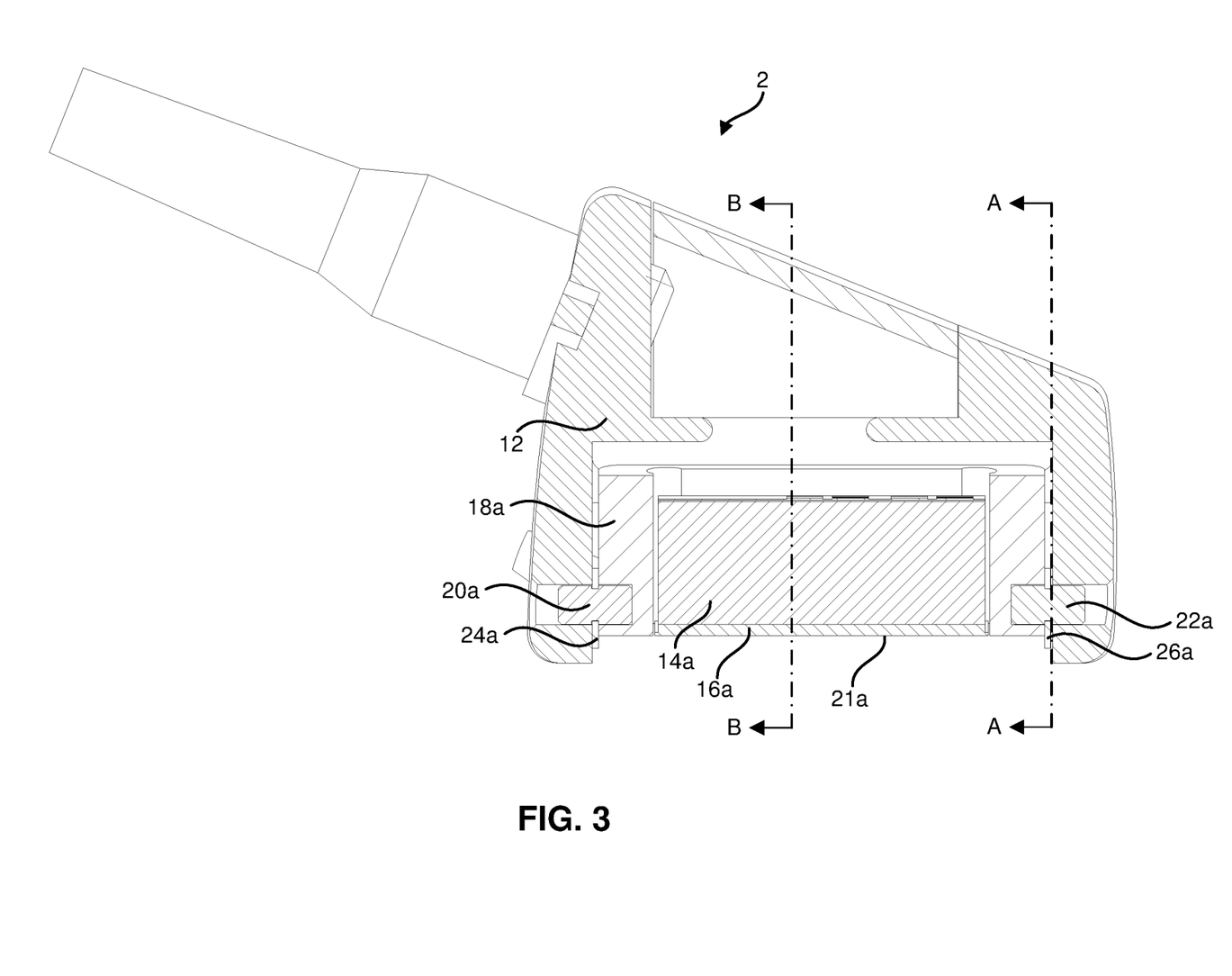
FIG. 3 is an elevation section view of a dual probe assembly according to the present disclosure.

FIG. 3 is a side section view of the left side of probe assembly 2, and illustrates an important novel aspect of the present disclosure. A left side backing layer 14a and left piezoelectric composite transducer 16a are contained within a left frame 18a. Left transducer 16a has a left transducer contact surface 21a. Left frame 18a is pivotably supported by a rear left dowel pin 20a and a front left dowel pin 22a. Dowel pins 20a and 22a are preferably held in place by a rear left retaining clip 24a and a front left retaining clip 26a respectively. It should be noted that an important novel aspect of the present disclosure is that dowel pins 20a and 22a, being substantially cylindrical in shape, allow frame 18a to rotate freely about an axis which is coaxial with the axes of dowel pins 20a and 22a.

Not shown in FIG. 3 are the equivalent features of the right side of probe assembly 2. A right side backing layer 14b and right piezoelectric composite transducer 16b are contained within a right frame 18b. Right transducer 16b has a right transducer contact surface 21b. Right frame 18b is pivotably supported by a rear right dowel pin 20b and a front right dowel pin 22b. Dowel pins 20b and 22b are preferably held in place by a rear right retaining clip 24b and a front right retaining clip 26b respectively. Dowel pins 20b and 22b are substantially cylindrical in shape, and allow frame 18b to rotate freely about an axis which is coaxial with the axes of dowel pins 20b and 22b.

Figure 4A:
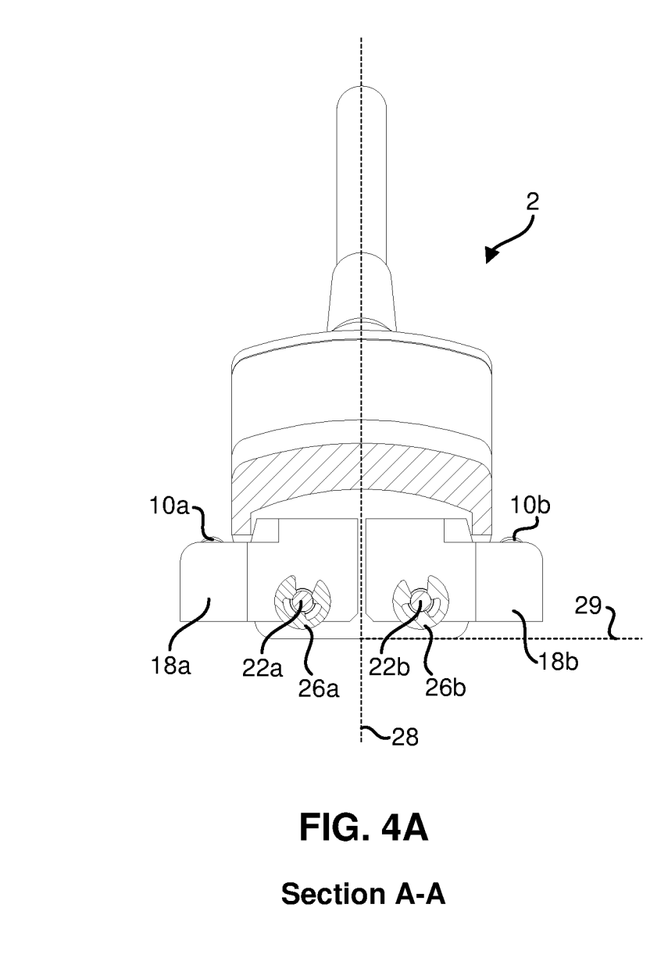
FIG. 4A is a section view of a dual probe assembly according to the present disclosure, with probes configured at 0° roof angle.
Figure 4B:
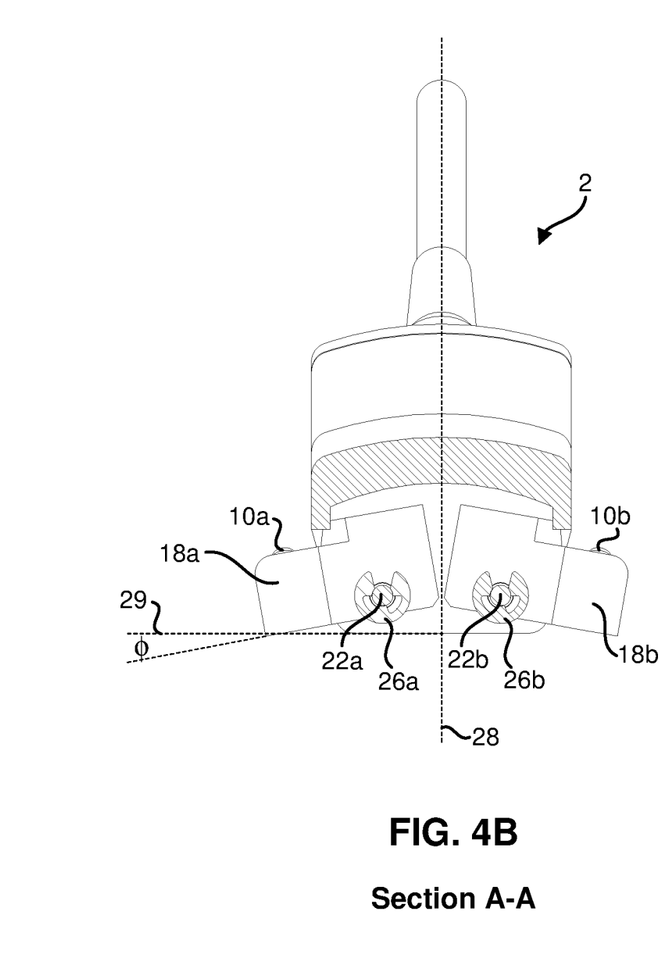
FIG. 4B is a section view of a dual probe assembly according to the present disclosure, with probes configured at 10° roof angle.

FIGS. 4A and 4B are sectional views of dual probe assembly 2 in the direction A-A as shown in FIG. 3. Dual probe assembly 2 has a central plane of symmetry 28. In FIG. 4A frames 18a and 18b are shown rotated to a roof angle φ of 0°. Roof angle φ is measured relative to a perpendicular plane 29, wherein perpendicular plane 29 is a plane perpendicular to central plane of symmetry 28. In FIG. 4B, frames 18a and 18b are shown rotated to a roof angle ϕ of 10°. Note that most pitch-catch inspection applications require a roof angle of between 0° and 10°. Note also that the through holes for screws 10a and 10b are included in frames 18a and 18b, so that screws 10a and 10b rotate to the same angle as frames 18a and 18b. However, probe assembly 2 may be configured so that screws 10a and 10b do not rotate, and all such configurations are within the scope of the present disclosure.

As can be seen in FIGS. 4A and 4B, dowel pins 22a and 20a (not shown) allow frame 18a to rotate freely, and dowel pins 22b and 20b (not shown) allow frame 18b to rotate freely.

FIGS. 5A and 5B are sectional views of dual probe and wedge assembly 1 in the direction B-B as shown in FIG. 3. FIGS. 5A and 5B illustrate how the roof angle is set by contact between dual probe assembly 2 and wedge assembly 6. In FIG. 5A, wedge assembly 6 comprises wedges 6a and 6b having upper wedge contact surfaces 17a and 17b defining a roof angle of 0°. In FIG. 5B, a wedge assembly 6' comprises wedges 6a' and 6b' having upper wedge contact surfaces 17a' and 17b' defining a roof angle of 10°. Note that upper wedge contact surfaces 17a and 17b have 0° inclination to perpendicular plane 29, upper wedge contact surface 17a' has +10° inclination to perpendicular plane 29, and upper wedge contact surface 17b' has −10° inclination to perpendicular plane 29.

Wedges 6a and 6b have lower wedge surfaces 19a and 19b respectively, and wedges 6a' and 6b' have lower wedge surfaces 19a' and 19b' respectively. The lower wedge surfaces are configured to conform to test surface 37 of test object 36. Lower wedge surfaces 19a' and 19b' may be the same as lower wedge surfaces 19a and 19b, in which case different roof angles of the same dual probe assembly may be used to inspect different depths of the same test object. Alternatively, lower wedge surfaces 19a' and 19b' may be different from lower wedge surfaces 19a and 19b, in which case different roof angles of the same dual probe assembly may be used for different test objects, for example pipes of different diameter.

Referring to FIGS. 4A, 4B, 5A and 5B, an important aspect of the present disclosure is that frames 18a and 18b are free to rotate about their respective dowel pins so that, in the absence of wedge assembly 6, dual probe assembly 2 does not have a defined roof angle. Dual probe assembly 2 is capable of operating with any roof angle that the design allows, such as between 0° and 10°, and a specific roof angle is only defined when probe assembly 2 is attached to wedge assembly 6, at which time the roof angle is defined by the inclination of upper wedge contact surfaces 17a and 17b. The pivot angle of transducer 16a is defined by the contact between left transducer contact surface 21a and upper wedge contact surface 17a, and the pivot angle of transducer 16b is defined by the contact between right transducer contact surface 21b and upper wedge contact surface 17b. The roof angles ϕ are passively yet accurately set for each situation.

It should be noted that an important novel aspect of the present disclosure is use of cylindrical dowel pins to pivotably attach transducers 16a and 16b to probe housing 12, thereby allowing rotational freedom, rather than fixing the transducers to the housing as in existing practice. There can be many ways of implementing pivotal joints to achieve this novel concept of rotational freedom, which are all taught and covered by the scope of this teaching. For example, dowel pins may be used singly or in pairs, and other forms of pivotal joint attachment may be used to achieve the rotational freedom.

Dual probe assembly 2 of the present disclosure allows increased flexibility and reduced cost compared with existing practice. Dual probe assembly 2 is much more expensive and much more difficult to manufacture than wedge assembly 6. The dual probe assembly with variable roof angle of the present disclosure therefore allows a user to customize use of a single dual probe assembly for multiple inspection operations by manufacturing wedge assemblies configured for different depths and for differently shaped test objects.

Although the present invention has been described in relation to particular embodiments thereof, it can be appreciated that various designs can be conceived based on the teachings of the present disclosure, and all are within the scope of the present disclosure.

What is claimed is:

1. A dual probe assembly comprising:
   a probe housing;
   a left frame supporting a left transducer pivotably attached to the probe housing by at least one left pivotable joint member on the left frame, and configured to couple to a left wedge allowing rotation of the left transducer independent of the left wedge;
   a right frame supporting a right transducer pivotably attached to the probe housing by at least one right pivotable joint member on the right frame, and configured to couple to a right wedge allowing rotation of the right transducer independent of the right wedge; and,
   wherein the left frame supporting the left transducer is free to rotate about a left rotation axis forming an adjustable left roof angle defined by an upper surface of the left wedge and a lower surface of the left transducer, and the right frame supporting the right transducer is free to rotate about a right rotation axis forming an adjustable right roof angle defined by an upper surface of the right wedge and a lower surface of the right transducer, wherein the left and right rotation axes are independent of each other.

2. The dual probe assembly of claim 1, wherein the left transducer is an acoustic transducer, and the right transducer is an acoustic transducer.

3. The dual probe assembly of claim 1, wherein the at least one left pivotable joint member is a pair of left cylindrical pins, and wherein the at least one right pivotable joint member is a pair of right cylindrical pins.

4. The dual probe assembly of claim 1, wherein the left frame includes a left coupling member to detachably couple the left wedge to the left frame, and the right frame includes a right coupling member to detachably couple the right wedge to the right frame.

5. The dual probe assembly of claim 1, further comprising a cable configured to make electrical connections to elements of the left transducer and the right transducer.

6. The dual probe assembly of claim 5, wherein the probe housing further includes a cable hole for the cable to go through.

7. A dual probe and wedge assembly comprising a dual probe assembly attached to a wedge assembly,
   wherein the dual probe and wedge assembly has a central plane of symmetry,
   wherein the dual probe assembly is detachably attached to the wedge assembly, and,
   wherein the dual probe assembly comprises:
   a probe housing;

a left transducer pivotably attached to the probe housing by at least one left pivotable joint member allowing rotation of the left transducer independent of the wedge assembly, the left transducer having a left transducer contact surface; and, a right transducer pivotably attached to the probe housing by at least one right pivotable joint member allowing rotation of the right transducer independent of the wedge assembly, the right transducer having a right transducer contact surface; and, wherein the left transducer is free to rotate about a left rotation axis and the right transducer is free to rotate about a right rotation axis; and, wherein the wedge assembly comprises:

a left wedge having a left wedge contact surface inclined at a left roof angle to a perpendicular plane, wherein the perpendicular plane is perpendicular to the central plane of symmetry; and, a right wedge having a right wedge contact surface inclined at a right roof angle to the perpendicular plane; and, wherein the left transducer contact surface is in contact with the left wedge contact surface inclined at the left roof angle, and the right transducer contact surface is in contact with the right wedge contact surface inclined at the right roof angle.

8. The dual probe and wedge assembly of claim 7, wherein the left transducer is an acoustic transducer and the right transducer is an acoustic transducer.

9. The dual probe and wedge assembly of claim 7, wherein the at least one left pivotable joint member is a pair of left cylindrical pins, and wherein the at least one right pivotable joint member is a pair of right cylindrical pins.

10. The dual probe and wedge assembly of claim 7, further comprising a left frame supporting the left transducer, and a right frame supporting the right transducer.

11. The dual probe and wedge assembly of claim 7, further comprising a cable configured to make electrical connections to elements of the left transducer and the right transducer.

12. The dual probe and wedge assembly of claim 11, wherein the housing further includes a cable hole for the cable to go through.

13. The dual probe and wedge assembly of claim 7, wherein the both of the left rotation axis and the right rotation axis are parallel to the central plane of symmetry.

14. The dual probe assembly of claim 4, wherein the left and right coupling members are screws.

15. The dual probe assembly of claim 4, wherein the left and right coupling members rotate at the same angles as the left and right frames, respectively.

16. The dual probe assembly of claim 4, wherein the left and right coupling members do not rotate with the left and right frames, respectively.

17. The dual probe and wedge assembly of claim 7, wherein when the wedge assembly is coupled to the dual probe assembly, the dual probe assembly and wedge assembly define the respective left and right roof angles.

18. The dual probe and wedge assembly of claim 7, wherein the left and right roof angles are each substantially between zero to ten degrees.

19. An inspection apparatus, comprising:

a probe assembly, comprising a first frame supporting a first transducer, a second frame supporting a second transducer, and a rotating mechanism on the first and second frames to rotate the first and second frames about a first and second axis, respectively and allowing rotation of the first and second transducers independent of a wedge assembly;

the wedge assembly, comprising a first and second wedge, each wedge including a lower surface to conform to a test surface, the first wedge including a first upper surface contacting the first frame defining a first adjustable roof angle with respect to a lower surface of the first transducer, and the second wedge including a second upper surface contacting the second frame defining a second adjustable roof angle with respect to a lower surface of the second transducer; and an acoustic barrier between the first and second wedges; and a coupling mechanism to detachably couple the probe assembly to the wedge assembly.

20. The inspection apparatus of claim 19, wherein the first and second frames are configured to rotate substantially zero to ten degrees about the first and second axis, respectively.

* * * * *

UNITED STATES PATENT AND TRADEMARK OFFICE
CERTIFICATE OF CORRECTION

PATENT NO. : 11,035,829 B2  
APPLICATION NO. : 15/795869  
DATED : June 15, 2021  
INVENTOR(S) : Jeffrey Wells Page 1 of 1

It is certified that error appears in the above-identified patent and that said Letters Patent is hereby corrected as shown below:

In the Claims

In Column 5, Line 2, in Claim 7, delete "pivotabie" and insert --pivotable-- therefor In Column 6, Line 25, in Claim 19, delete "al lowing" and insert --allowing-- therefor Signed and Sealed this  
Twenty-sixth Day of October, 2021

Drew Hirshfeld  
*Performing the Functions and Duties of the*  
*Under Secretary of Commerce for Intellectual Property and*  
*Director of the United States Patent and Trademark Office*